F. LAPLANT.
MACHINE FOR MAKING TWIST DRILLS.
APPLICATION FILED AUG. 3, 1908.

935,851.

Patented Oct. 5, 1909.
6 SHEETS—SHEET 3.

Witnesses.
A. C. Thomas
H. E. Chase

Inventor.
Frank Laplant
By.
Howard P. Denison
Attorney

UNITED STATES PATENT OFFICE.

FRANK LAPLANT, OF SYRACUSE, NEW YORK.

MACHINE FOR MAKING TWIST-DRILLS.

935,851.      Specification of Letters Patent.      Patented Oct. 5, 1909.

Application filed August 3, 1908. Serial No. 446,828.

*To all whom it may concern:*

Be it known that I, FRANK LAPLANT, of Syracuse, in the county of Onondaga, in the State of New York, have invented new and useful Improvements in Machines for Making Twist-Drills, of which the following, taken in connection with the accompanying drawings, is a full, clear, and exact description.

This invention relates to certain improvements in machines for making twist drills in which a circular rod or drill blank of the desired diameter is passed between two rotary and axially movable rolls having one or more spiral grooves and corresponding ribs in the bases thereof, the grooves serving as dies and guides to form the drill and retain it in proper position while the ribs at the bases of said grooves impress the spiral grooves in the drill blank.

My main object is to provide a simple, practical and efficient grooving mechanism involving the use of coacting spirally ribbed rolls for expeditiously forming opposed spiral grooves in any round rod of suitable metal and particularly for forming drills as distinguished from the usual method of twisting the rods after the groove is formed. In other words I have sought to provide means whereby spiral grooves may be formed in practically a single operation under a rolling action in any metal bar or rod.

Other objects and uses relating to specific parts of the machine will be brought out in the following description.

In the drawings Fig. 12 is a horizontal sectional view through the main driving shaft upon which the driving pulley is mounted showing the continuously rotating central driving shaft as secured to the pulley, and also showing the clutch and train of gears for transmitting motion to the rollers. Fig. 13 is a top plan partly in section of a portion of the rock arm for moving the drill backward and forward, showing the crank arm and connection for rocking said arm, and also showing the pendent arm for stopping the machine after the drill has been withdrawn from the last pass of the series.

In carrying out the objects stated, a round rod or drill blank —1— of the desired length and diameter is held in a suitable chuck or gripping device —2— and is reciprocated between a pair of groove-forming rollers —3— and —3'— by means of a carriage —4— upon which the chuck —2— is mounted. These rollers —3— and —3'— are journaled one above the other in suitable bearings —5— of a main supporting frame —6— and each is provided with a series of in this instance four spiral grooves —7— and a corresponding number of spiral ribs —8— at the bases of their respective grooves —7—, each groove and its corresponding rib extending continuously around substantially half the circumference of its roller and is of sufficient length to receive and groove the portion of the rod or drill blank which is to be grooved during practically one half turn of the rollers.

In practice the grooves and the corresponding ribs of the opposed rollers are arranged in sets or pairs and are normally positioned at the back of said rollers with their meeting ends in exact registration at the meeting faces of the rollers thereby forming a series of circular guide openings of substantially the same but slightly greater diameter than the drill blank so that the latter may be easily passed therethrough while the rollers are in their normal position, it being understood that the ribs at the bases of the grooves terminate short of the ends of said grooves to afford clear circular passages for the drill rod or blank therethrough.

The ribs —8— of each coacting set are of the same depth and curved in cross section but the depth and curve of those of different sets vary or increase progressively from one end toward the opposite end of the rollers so that the grooves in the drill rod or blank may be formed gradually to the desired depth by passing it successively between the sets of ribs of progressively increasing depth.

The rollers are rotated intermittingly one complete revolution by suitable driving mechanism hereinafter described and are caused to stop after each revolution with the terminal ends of their coacting grooves in registration at their meeting faces, thus forming a corresponding number of circular guides for the drill rod or blank as previously described. When the rollers are in this position of rest, they are also at their extreme limit of axial movement in opposite directions and the drill rod —1— is then adjusted in the chuck —2— leaving the greater portion thereof which it is desired to groove protruding beyond the tips of the chuck jaws and alined with the desired guide opening or circular passage at the meeting faces of the rollers, after which the carriage is advanced by hand or otherwise toward said rollers to force the exposed portion of the drill rod entirely through such passage whereupon the rollers are rotated in the direction indicated by arrows —X— to bring the corresponding ribs —8— into active engagement with the drill rod or blank for forming opposite grooves therein, the length of the ribs —8— being equal to or greater than the portion of the drill rod which it is desired to groove. During this rotary action of the rollers they are also moved axially in opposite directions at the same rate of speed, depending upon the pitch of the spiral ribs and speed of rotation but at such speed as to maintain exact registration of the grooves and ribs of each set at the meeting faces of the rollers. This combined rotary and axial movement of the rollers operates to feed the drill rod and carriage backward until the drill is expelled and also gradually rolls said drill rod between the coacting ribs —8— and in the corresponding grooves —7— thereby expelling the rod from between the rollers and at the same time forming lengthwise spiral grooves in its opposite sides, the spiral formation being due to the gradual turning of the rod while moving endwise.

It is evident from the foregoing description that the meeting faces of the rollers rotate in the same direction toward the carriage and that after the withdrawal of the rod from the first passage it may be passed successively through the remaining passages for gradually deepening the grooves therein, without overstraining the grooving or grooved elements, although in some instances the groove in the drill rod may be made of sufficient depth in a single operation. The rollers are rotated positively by intermeshing gears —10— and —10'— which are splined on their respective shafts so as to allow the latter to move endwise therethrough, said gears being held from endwise movement between the adjacent portion of the frame and suitable plates —12— which are secured to the frame by tie bolts —13—.

Rotary motion is imparted to the lower roller shaft by a suitable train of gears —14—, —15, 16— and —17— and pulley —18— which is loosely mounted upon a shaft —19— and is adapted to be connected thereto by any ordinary clutch mechanism —20— which is self acting to establish such connection. The gear —14— is coaxial with and secured to the gear —10— on the shaft of the lower roller —3— and is also splined on the shaft to allow the latter to move endwise therethrough. The pinion —15— and gear —16— are mounted upon a counter shaft —21—, the pinion —15— meshing with the gear —14— while the gear —16— meshes with the pinion —17— which latter is mounted upon the shaft —19—.

Figure 4:
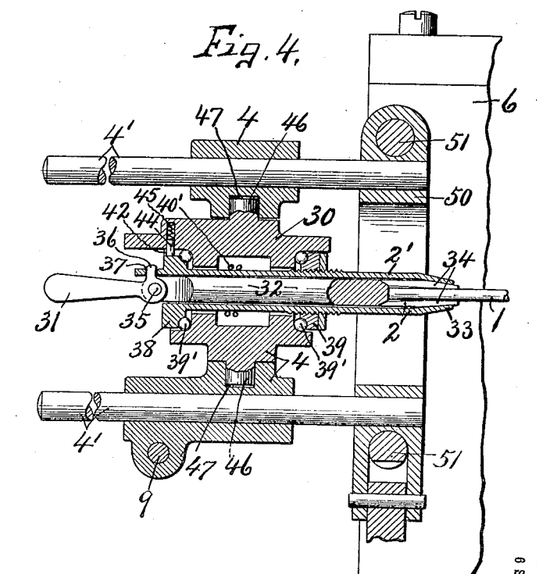
Figs. 4, 5, 6 and 7 are enlarged detail sectional views taken respectively on lines 4—4, 5—5, and 6—6, Fig. 2 and 7—7, Fig. 1.

The pulley may be connected by a belt to any available source of power, not shown, and is normally loose and rotated continuously, suitable means hereinafter described being provided for disconnecting the clutch from the pulley at each cycle of operation of the rollers —10— and —10'—, said means being arranged so as to throw the clutch out of its operative position after the reducing has taken place and when the rollers assume their normal position and when those portions of the groove —7— are in registration with each other which form the circular passages for the reception of the drill rod or blank. When the terminal ends of the grooves —7— are registered in the manner just described at the meeting faces of the rollers, said rollers have assumed their extreme positions in opposite directions, their axial movement having been effected by means of cams or spirally grooved collars —24— and roller studs —25— which enter the grooves —24— and are in this instance mounted in fixed bearings —26— upon the supporting frame. The spirally grooved collars —24— are secured to corresponding ends of the roller shafts, the grooves being pitched in opposite directions and of substantially the same pitch as the spiral grooves in the rollers so that when the latter are revolved the rollers —25— engage their respective spiral grooves —24— and thereby force the rollers —10— and —10' axially in opposite directions at substantially the same rate of speed as they are rotated, thereby keeping the passages for the drill rods in the same position during each revolution. During this axial movement of the rollers, the interposed drill rod which is in one of the passages is turned or rolled gradually therein as it is moved endwise by the rotation of the rollers, the coacting ribs —8— of said rollers forming lengthwise spiral grooves in the drill rod. As previously stated, the drill rod is firmly held in a suitable chuck —2—, of which the sleeve —2'— forms a part, said chuck being rotatable within a horizontally swinging turret frame —30— which in turn is journaled in the sliding frame —4—, the latter being guided upon suitable guide rods —4'— as best seen in Fig. 4. This chuck —2— is provided with an inner axially movable spindle —32— having tapering spring jaws —34— which receive and grip the end of the drill rod —1—, said spindle —32— being movable axially in the sleeve —2'— by means of the cam lever —31— to force the tapering spring jaws —34— into frictional engagement with a tapering end as —33— on the adjacent end of the sleeve —2'— whereby the spring jaws are clamped upon the drill rod.

The means for operating the spindle —32— endwise is best shown in Fig. 4 and consists of the lever —31— which is pivoted at —35— to the adjacent end of the spindle and is provided with a lateral projection —36— which rides in a slot —37— in the adjacent end of the sleeve —33—, said sleeve being held from endwise movement in the turret frame —30— and is usually provided with collars —38— and —39— one of which is adjustable axially to take up wear, the friction between the collars —38— and —39— and turret frame —30— being reduced by anti-friction ball bearings —39'—.

Figure 7:
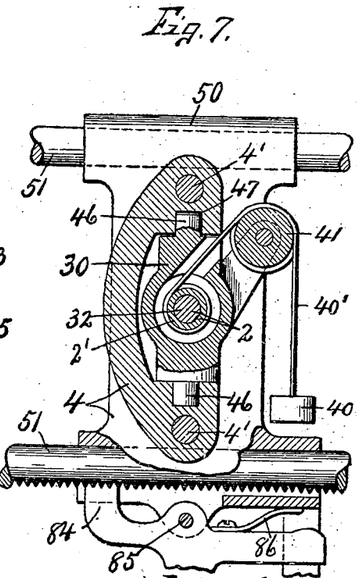

As previously described during the axial movement of the rollers —10— and —10'— in opposite directions the interposed drill rod which is being grooved is rotated upon its axis and, being firmly secured with the sleeve —2'— the latter is similarly rotated within the turret frame —30— against the action of a counter-weight —40— which is attached to one end of a cable —40'—, the latter passing over a suitable idler —41— and having its opposite end attached to the periphery of the sleeve —2'—. (See Figs. 4 and 7.) The object of this counter-weight —40— and its connection with the sleeve —30— is to rotate the chuck and drill rod therein to its starting position after being withdrawn from the rollers and after each grooving operation and in order that this sleeve and drill rod therein may be stopped upon its return in exactly the same position at which it started I provide one of the collars as —38— with a shoulder —42— which engages a movable stop pin —44—, the latter being mounted in a suitable socket in the turret frame —30— and is forced into operative position by a spring —45—. (See Figs. 2 and 4.) The turret frame —30— is provided with suitable trunnions or journals —46— which turn in sockets or bearings —47— in the frame —4— to permit the turret and chuck with the drill therein to be turned or reversed when the drill rod is withdrawn from the rollers so that said drill rod may be readily inserted or removed from the chuck without interference with the rollers. After the drill rod has been operated upon in the manner previously described by one set of said ribs on the rollers —10— and —10'— the carriage —4— with the drill rod therein may be shifted axially of the rollers —3— and —3'— to bring the drill rod in registration with another pass and next adjacent set of coacting spiral ribs —8— and for this purpose the guide rods —4'— upon which the carriage —4— is mounted are secured to a second carriage —50— which is guided upon suitable rods —51— parallel with and in front of the rollers —3— and —3'—, it being understood that when the drill rod is registered with the next set of grooving ribs —8— in the rollers —3— and —3'—, said rollers are again rotated and moved axially by throwing the clutch —20— into operative position. In like manner the carriage for the drill rod may be shifted successively to the remaining passes or sets of ribs in the rollers —3— and —3'— and the operation hereinbefore described repeated until the drill rod is grooved to the desired depth. As the carriage —50— is shifted to its different positions it is held against accidental movement by a detent —84— pivoted at —85— to the bottom of the carriage —50— and one end provided with teeth which engage similar teeth in the under side of the lower rod —51—, said detent being held in its operative position by a spring —86—. (See Fig. 2.)

Figure 3:
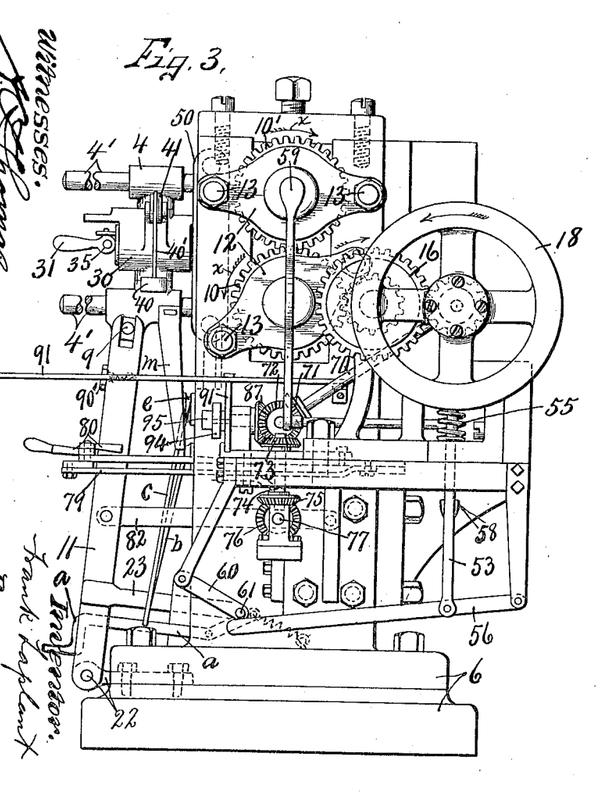
Fig. 3 is an end view of the machines shown in Figs. 1 and 2.
Figure 6:
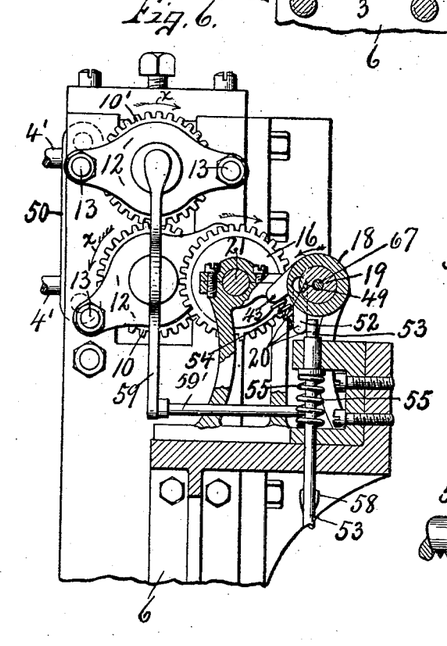

The clutch mechanism —20— previously referred to comprises essentially a collar —48—, and a clutch pin —49— which latter is passed through a drill hole formed partly in the hub of the pulley and partly in the shaft —19—, the portion of such clutch pin in the pulley and shaft being cut away concentric with the periphery of the shaft so that when the pin is adjusted to one position as shown in Fig. 6, the pulley may revolve freely around said pin but when the pin is rocked to a different position, it locks the pulley to the shaft. The collar —48— and adjacent end of the clutch pin —49— are provided with coacting laterally projecting arms —43— and —52— respectively, between which is mounted a coil spring —54— tending to move the arm —52— from the arm —43—, it being understood that the collar —48— is rigidly secured to the shaft —19— while the spring —54— operating upon the arm —52— acts to rock the clutch pin —49— into position to lock the pulley —18— to the shaft —19—. Action, however, is normally prevented by the rotation of the arm —52— against a movable stop pin —53— which in this instance consists of a vertically movable plunger held in its normal position by a spring —55—, said plunger being connected to and withdrawn against the action of the spring by a pedal lever —56— under the control of the machine as best seen in Fig. 3. When the arm —52— of the clutch pin —49— is brought into engagement with the stop pin —53—, the clutch pin is thrown to its inactive position as shown in Fig. 6 thereby stopping the further action of the grooving rollers —3— and —3'— and permitting the loose pulley to continue to rotate.

When it is desired to operate the rollers, the stop plunger —53— is drawn downward by the pedal lever —56— against action of the spring —55— out of engagement with the arm —52— thus permitting the compression spring —54— to act upon said arm —52— to rock the clutch pin —49— to its locking position, as soon as the part of the opening in the hub of the pulley comes into registration therewith. When the stop —53— is withdrawn from holding engagement with the arm —52—, it is held in this position by a detent —57— which temporarily interlocks with a shoulder —58— on the stop plunger —53—. The pulley —18— is now locked to the shaft —19— to rotate the rollers —3— and —3'— one complete revolution through the medium of the gears —17—, —16—, —15— and —14— thereby rotating the grooved cam —24— and causing said rollers to be moved axially in opposite directions from their starting positions and returned. During this operation, the drill blank —1— is fed backwardly by the rollers —3— and —3'— and simultaneously grooved by the ribs —8— until said drill is expelled from between the rollers.

Figure 1:
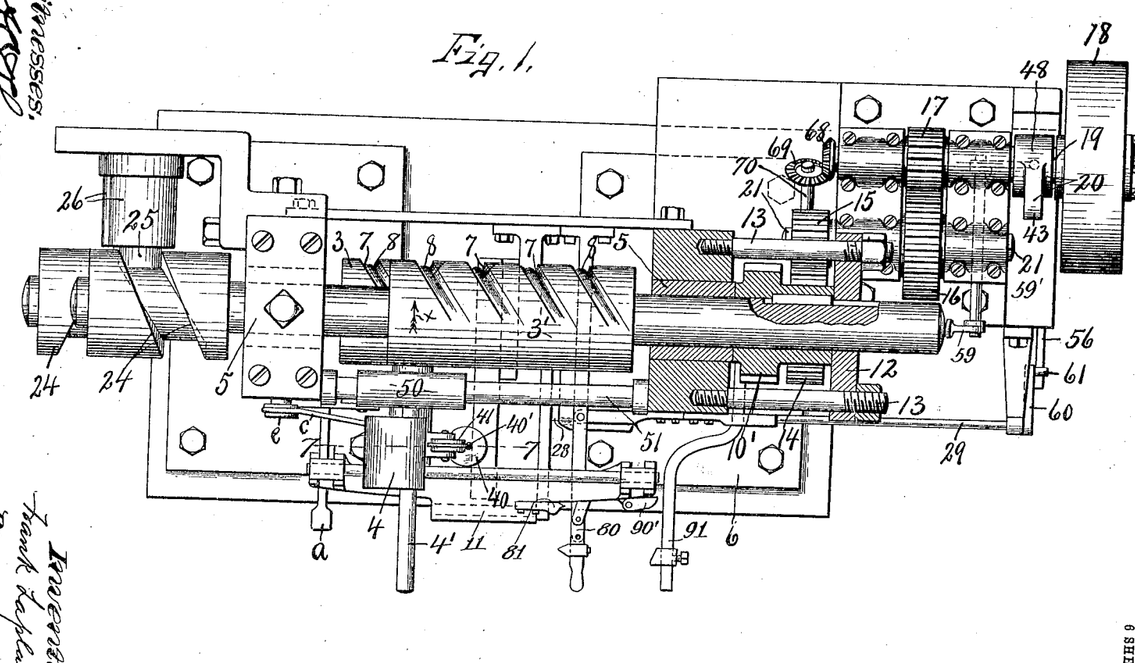
—Figure 1 is a top plan partly in section of a spiral drill forming machine embodying the various features of my invention.
Figure 2:
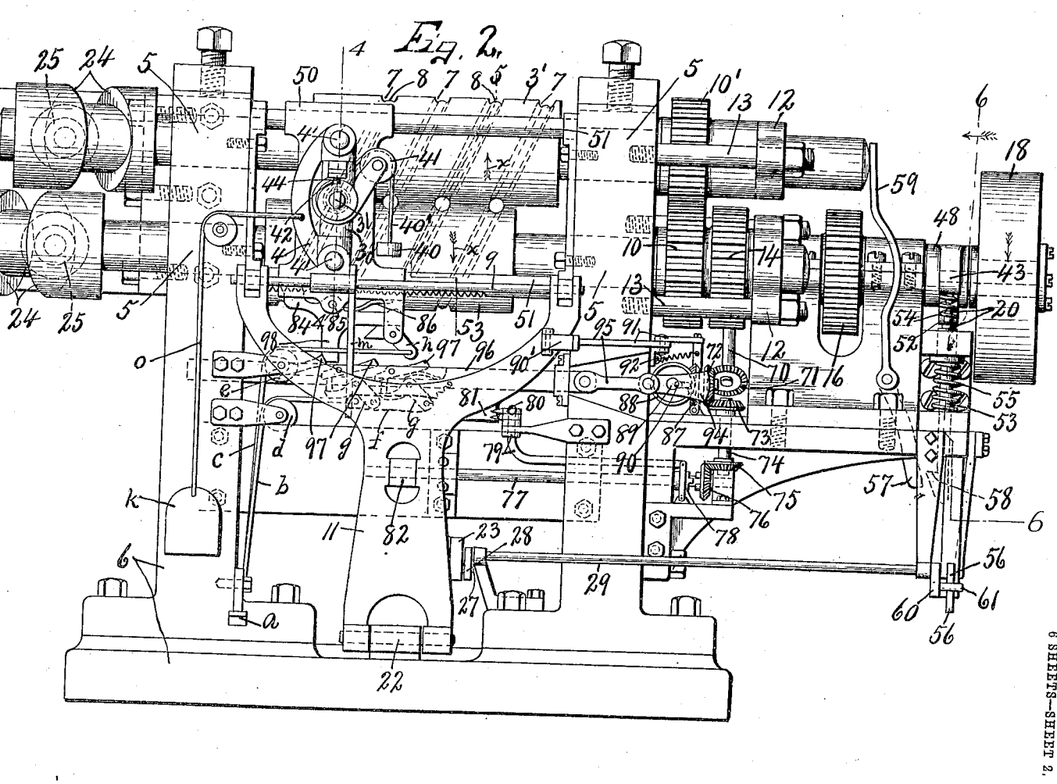
Fig. 2 is a front elevation of the same machine.

The lower portion of the carriage —4— is connected to and slidable lengthwise of a rod —9— which in turn is mounted upon the upper end of a rock arm or frame —11—, the latter being pivoted at its lower end upon a suitable support —22— on the base of the main frame —6— as best seen in Figs. 2 and 3 so that the backward feeding of the drill imparts similar rocking movement to the carriage —4— and rock arm or frame —11— to which the carriage is connected, the forward or return movement of the rock arm —11— being effected by suitable mechanism driven from the main power shaft in a manner hereinafter described for feeding the carriage —4— forwardly to cause the drill blank to be fed through the dead portion of the pass or grooves in the rollers with which it may be alined. This backward and forward movement of the rock arm —11— and carriage —4— connected thereto is automatic and synchronized with the movement of the rollers —3— and —3'— and together with the axial movement of the upper roller —3'— is utilized to control the action of the plunger —53— as follows: Secured to the rock arm —11— some distance above its fulcrum is a rearwardly projecting arm —23— having at its rear end a laterally projecting pin —27— which with the rock arm —11— is rocked rearwardly and engages and depresses a crank arm —28— on the adjacent end of a horizontal rock shaft —29—, the opposite end of said rock shaft being provided with a similar crank arm —60— which in turn is provided with a laterally extending pin —61—, the latter riding upon the front end of the lever —56— previously mentioned, so that as the rock-arm —11— is rocked rearwardly, the rear end of the arm —23— will be depressed against the pin —27— thereby rocking the shaft —29— and causing the pin —61— on the crank arm —60— to engage and depress the adjacent end of the lever —56— thereby withdrawing the stop plunger —53— out of engagement with the clutch arm —42— allowing the clutch to lock the pulley —18— to the shaft —19— for rotating the rollers —3— and —3'— in the direction indicated by arrow —X— and for moving them axially through the medium of the cams —24— acting upon the roller —25— thus returning the drill and its carriage together with the rock arm —11— to its starting position ready to reinsert the drill in another pass in the manner previously described. This return of the rock arm to its starting position away from the rollers —3— and —3'— elevates the rear end of the arm —23— and similarly elevates the free end of the arm —28— which is connected thereto thereby rocking the shaft —29— and its crank arm —60— in the opposite direction to move the pin —61— out of engagement with the lever —56— thus leaving the plunger —53— free to be moved upwardly to its locking position by the spring —55— as soon as the detent —57— is tripped from its holding position. This tripping of the detent —57— is accomplished simultaneously with the return movement of the rollers —3— and —3'— to their starting position by reason of the end thrust engagement of the shaft of the roller —3'— with the upper end of the lever —59—, that is the rock arm —11— is forced backwardly by the action of the rollers on the drill during the rotation of the rollers —3— and —3'—, such rotation and also the axial movement of the rollers continuing through one revolution or cycle of movement until the shaft of the roller —3'— returns axially to its starting position to trip the detent —57— and allow the stop plunger —53— to resume its locking position to throw the clutch —49— into position to release the pulley —18— from its shaft —19— the detent —57— and the lever —59— being secured to the same rock shaft, as —59'—, which is journaled in the main frame, as shown particularly in Fig. 6.

Figure 5:
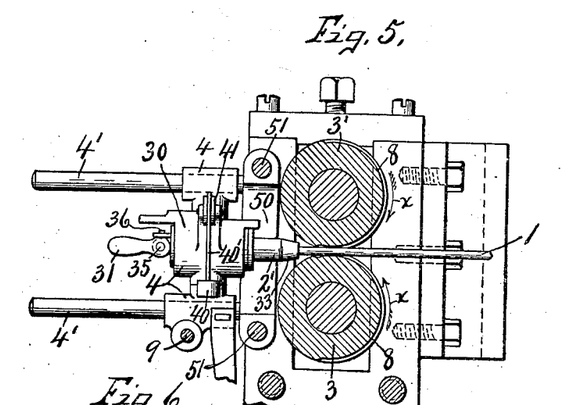

The rock arm —11— is now moved forwardly to feed the drill between the rollers and through one of the passes by the following mechanism: A rotary spindle or shaft —67— is passed centrally through the shaft —19— and rigidly secured to the pulley —18— so as to always rotate therewith and upon the inner end of this shaft is secured a bevel gear —68— meshing with a similar bevel gear 69— on an incline shaft —70—, the lower end of said shaft being provided with a bevel gear —71— meshing with an idler —72— which in turn meshes with a similar bevel gear —73— on an upright shaft —74—. This latter shaft is provided at its lower end with a bevel gear —76— which is loose on a horizontal shaft —77— as best seen in Fig. 2 and is adapted to be connected to said shaft by a clutch —78— upon the return of the rock arm —11— toward its starting position by the rolling action of the rollers upon the drill, said clutch being thrown into engagement with the bevel gear —76— by means of a link —79— which is connected to a rock arm —80— the latter having one end lying in the path of a shoulder —81— on the rock arm —11— as shown in Fig. 2. The shaft —77— is connected by a pitman —82— to the rock arm —11— for the purpose of further withdrawing the rock arm and drill away from the rollers, and permitting the drill carriage to be shifted axially to the next succeeding pass, the clutch —90— remaining in action for advancing the rock arm —11— toward the rollers to insert drill through such succeeding pass. Assume that the drill is registered with the first pass of the series as shown in Fig. 2, and that the arm —11— is rocked backwardly away from the rollers to its starting position for forming a drill, then the lever —80— is rocked by hand to throw the clutch —78— into its operative position to rotate the shaft —77—, it being understood that the rollers are at rest in their normal or starting positions and that the driving pulley —18— is actuating the gears —68 and 69— and the shaft —77— through the medium spindle —67—, which passes through the shaft —19— as shown in Fig. —6—, then the rock arm —11— will be advanced toward the rollers to force the drill through the alined pass, with the drill in position ready to be operated upon by the rollers, as shown in Fig. 5. As the rock arm —11— approaches the limit of its inward rearward movement, the rear end of the arm —23— encounters the adjacent end of the lever —56— thereby drawing the plunger —53— downwardly against the action of the spring —55— and allowing the spring —54— to throw the clutch member —49— into action to lock the driving pulley —18— to shaft —19— and thereby rotate the rollers 3 and 3′. This rotation of the rollers causes the spiral ribs in the first set of spiral grooves to engage and groove the drill blank and thereby feed its carriage and rock arm —11— backwardly from the rollers toward their starting positions, and at the same time the cams —24— coacting with roller or studs —25— move the rollers axially in opposite directions, thereby rolling and forming the drill in the corresponding pass or grooves. As the rock arm —11— is forced from the rollers by the action of the latter upon the drill, the shoulder —81— encounters one of the fingers of the lever —80— at about the time the drill is expelled from between the rollers, thereby operating the arm —29— to throw the clutch —78— into action and causing the further movement or full return of the rock arm —11— and drill carriage to their starting positions. After the drill has been acted upon by the ribs and grooves of the first set, and while the arm —11— is being returned to its starting position, to clear the drill from the rollers, the drill carriage is shifting to the next succeeding pass by the following mechanism.

Figure 8:
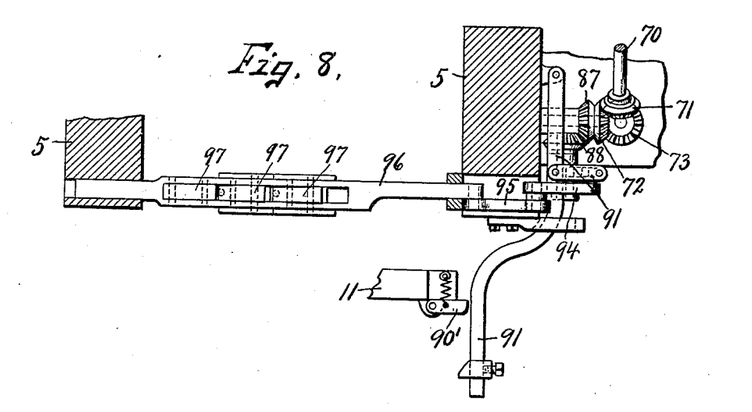
Fig. 8 is a detail plan of the mechanism for shifting the carriage to different passes showing also the operating gears and clutch.
Figures 9, 10, 11:
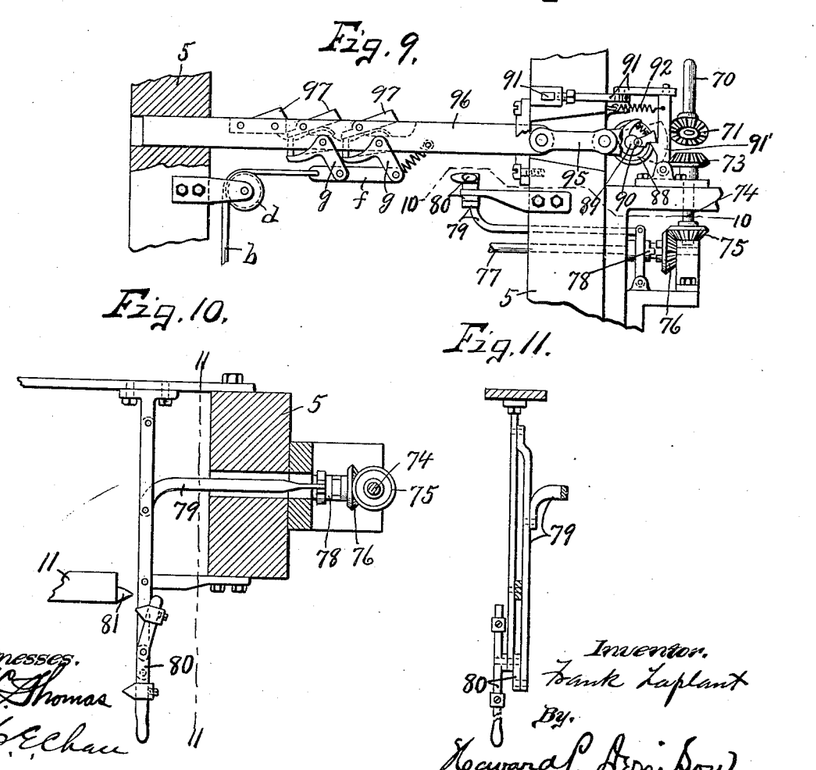
Fig. 9 is an elevation of the mechanism seen in Fig. 8.
Fig. 10 is a sectional view taken on line 10—10, Fig. 9.
Fig. 11 is a sectional view taken on line 11—11 Fig. 10.
Figures 12, 13:
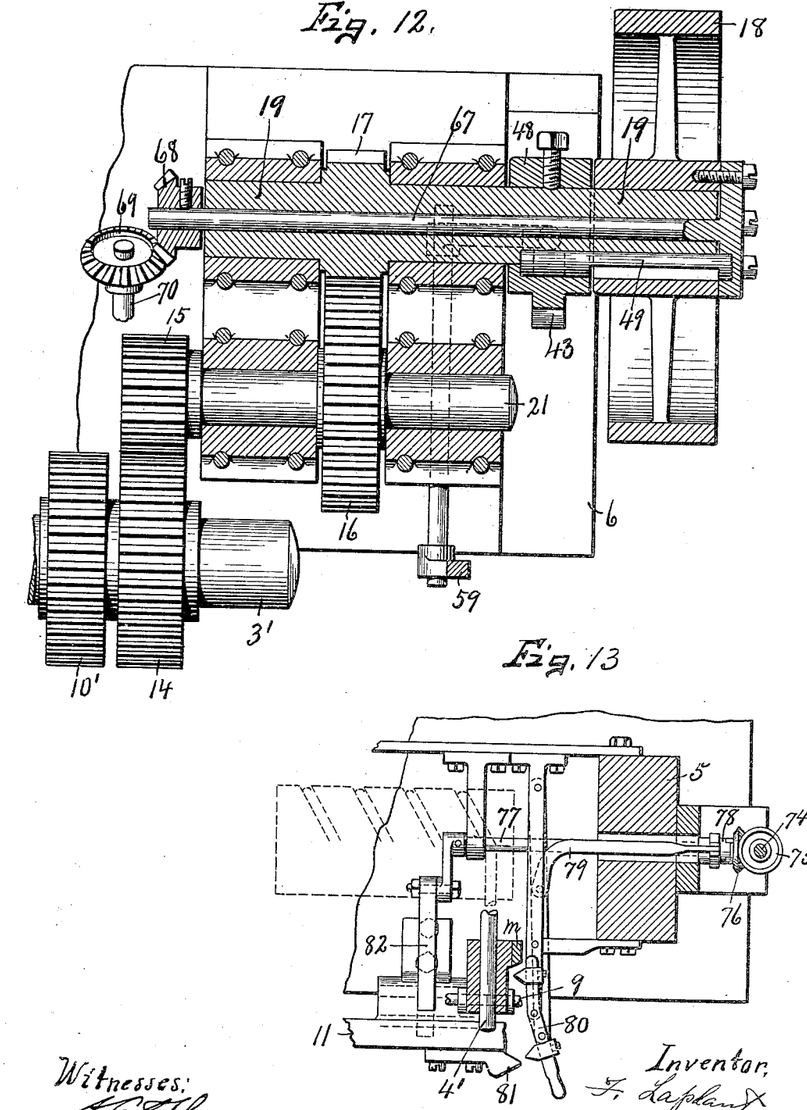

A gear —87— is connected to, and driven by, the bevel gear —72—, and in turn rotates a similar bevel gear —88— which is loose on a shaft —89— and adapted to be connected thereto by a clutch —90— similar to the clutch —49— as the rock arm —11— is rocked backwardly to withdraw the drill from between the rollers. During this backward movement of said rock arm an arm —90′— thereon engages a bevel shoulder on the outer end of a lever and link connection —91—, Fig. 8, thereby tripping a suitable detent —91′—, Fig. 9, which normally holds the clutch —90— in its inoperative position so that as soon as the detent —91— is tripped, the clutch —90— will be thrown into its operative position by its operating spring, thereby locking the bevel gear —88— to the shaft —89— and causing the rotation of a crank arm —94— on the shaft —89— for operating the slide-bar —96— and thereby shifting the drill holder to the next pass of the series and returning the arm —96— to its starting position, the detent —91— being drawn back to its holding position by a spring —92— to reëngage and unlock the clutch —90— after the drill holder has been shifted in the manner just described.

Secured to the shaft —89— is an eccentric arm —94— which is connected by a link —95— to a sliding bar —96— carrying a series of, in this instance three, yielding pawls —97— spaced apart a distance corresponding to the spaces between the passes in the rollers —3— and —3′— and adapted to successively engage a pendant arm —98— on the detent —84— whereby the detent —84— is disengaged from the toothed rack on the adjacent bar —51— and together with the carriage is moved axially of the rollers the distance between adjacent passes, whereupon the pendant arm —98— is brought into engagement with the next succeeding detent —97—, the throw of the eccentric —94— being sufficient to accomplish this result and to return the bar —96— with the detents thereon to their starting positions leaving the carriage with the drill thereon in registration with the next succeeding pass at about the same time, or immediately after the clutch —78— has been thrown into action, the shoulder —90'— on the rock arm —11— engages and operates the lever —91— to throw the clutch —90— into action, and thereby cause the crank arm —94— to be revolved one complete revolution, the first half of which serves to draw the drill carriage axially of the rollers one pass-space to bring the drill into registration with the next succeeding pass. This shifting of the drill carriage and return of the sliding bar —96— by the complete rotation of the crank —94— occurs during the action of the rock arm backwardly to its starting position, the clutch —78— being held in operative position to advance the rock arm sufficiently to force the drill through the alined pass. At about the same time that the drill has been forced rearwardly to be acted upon by the rollers the shoulder —81— on the rock arm —11— comes in contact with another finger on the lever —80— to throw the clutch —78— out of action, thereupon the clutch releasing plunger —53— is actuated in a manner previously described to throw the clutch into action for operating the rollers 3 and 3', and thereby forming the drill under the rolling action and returning carriage toward its starting position. This operation is repeated through the successive passes of the rollers until the drill is finished by the last set of ribs and when the drill is completed by the action of the last set of groove forming ribs thereon during which the rock arm —11— is thrown backwardly toward its extreme starting position, the further feeding action of the carriage —4— and rock arm —11— is stopped by means of an arm —m— depending from the carriage —4—, said arm acting upon one of the levers —80— to throw the clutch —78— out of action whereupon the carriage —4— is in position to be returned to its starting position with the drill chuck in alinement with the first pass or set of groove forming ribs. After the drill has been withdrawn from the last pass of the series and the arm —11— returned toward its starting position, the arm —m— which at this time is moved to a position just at the rear of one of the fingers —80— encounters such finger and operates the link —79— to throw the clutch —78— out of action so as to stop the advance or rearward movement of the rock arm —11— at about the same time that it reaches its backward or starting position whereupon the drill carriage is moved axially of the rollers to the starting position in alinement with the first pass of the series. This return of the carriage —4— is accomplished by first throwing the pawls —84— and —97— from their operative positions through the medium of a foot lever —a— and cables —b— and —c— which are passed from idlers —d— and —e— respectively. The cable —b— is connected to a link —f— which in turn is connected to a pair of lifting pawls —g—, the latter being operatively connected to the detents —97— to depress the active ends of the latter when the links —f'— are drawn in the opposite direction by the depression of the pedal —a— thereby throwing the pawls —97— out of the path of the pendant —98— of the detent —84—. This detent —84— is also thrown out of action by a pawl —h— which is connected by the cable —c— to the pedal lever —a— thereby throwing the toothed end of the pawl —84— out of engagement with the corresponding teeth on the adjacent bar —51—. As soon as the carriage is released by throwing the detents —84— and —97— from their operative positions, said carriage is returned to its starting position by a counter-weight —k— and cable —o— connecting the weight to the carriage —4—.

Just before or as soon as the drill is expelled by the backward feeding of the rollers —3— and —3'—, the rock arm —11— engages the hand lever —80— and throws the clutch —78— into action to continue the return movement of the rock arm —11— to its extreme starting position and during this latter movement or as soon as the drill is expelled from the rollers, the mechanism for shifting the carriage —4— with the drill thereon is brought into action to shift said carriage to bring the drill into alinement with the next succeeding pass, this operation being repeated after each action of the rollers upon the drill. When the finished drill is expelled from the last pass of the series, the arm —m— is brought into position to engage and shift the lever —80— during the return movement of the rock arm —11— to its starting position and throw the clutch —78— out of action thereby preventing further action of the carriage feeding mechanism thereby stopping the further movement of the rock arm —11— to permit the operation of the pedal lever —a— to release the carriage and permit it to be returned to its starting position by means of the weight —k—, the clutch being thrown into action at the starting of the drill through the first pass by means of the hand lever —80—.

Having described my invention, what I claim is:

1. In a machine for making drills, a pair of rotary axially movable rollers having coacting spiral ribs for engaging and grooving the drill rod spirally during such rotary and axial movement of the rollers, means for rotating the rollers, and additional means for moving the rollers axially in opposite directions during such rotation.

2. In a machine for making drills, a pair of spirally grooved parallel rollers having spiral ribs at the bases of the grooves, means for rotating the rollers, and additional means for moving said rollers axially and simultaneously in opposite directions at such speed as to keep the meeting faces of the ribs in registration.

3. In a machine for making drills, a pair of parallel rollers having spiral grooves and corresponding spiral ribs at the bases of the grooves, means for rotating the rollers, and additional means for moving said rollers axially and simultaneously in opposite directions.

4. In a machine for making drills, a pair of rollers having co-acting sets of spiral grooves and spiral ribs at the bases of the grooves, means for rotating the rollers, additional means for moving the rollers axially in opposite directions during such rotation, a drill holder movable lengthwise of the rollers into registration with the different sets of grooves, means for moving the drill holder toward and from the rollers, and additional means for successively moving the drill holder into registration with the several sets of spiral grooves.

5. In a machine for making drills, a pair of rollers having spiral grooves and corresponding spiral ribs at the bases of the grooves, means for rotating the rollers, additional means for moving said rollers axially and simultaneously in opposite directions at such speed as to keep the co-acting grooves and ribs in registration at the meeting faces of the rollers, and means for feeding the drill rod into the registering grooves, the ribs engaging and returning the rod.

6. In a machine for making drills, a pair of rotary axially movable rollers having co-acting spiral grooves and spiral ribs at the bases of the grooves, means for rotating the rollers, additional means for moving the rollers axially in opposite directions during such rotation, and means for feeding the drill into the registering grooves and between the rollers.

7. In a machine for making drills, a pair of spirally grooved rollers having spiral ribs at the bases of the grooves, means for rotating the rollers, and additional means for moving said rollers axially in opposite directions relatively to each other at such speed as to keep the meeting faces of the ribs in registration, and means for moving the drill rod between the rollers.

8. In a machine for making drills, a pair of rollers having spiral grooves and corresponding spiral ribs at the bases of the grooves, means for rotating the rollers, additional means for moving said rollers axially in opposite directions relatively to each other, a chuck for the drill rod, and a revolving turret for supporting the chuck.

9. In a machine for rolling spirally formed metal, a pair of rolls each having separate passes consisting of spiral grooves and corresponding spiral ribs at the base of the grooves, means for rotating the rolls, additional means for moving said rollers axially in opposite directions relatively to each other, a carriage and means for moving said carriage axially to bring the blank in line with each pass.

10. In a machine for rolling spirally formed metal, a pair of rolls, having spiral grooves, and corresponding spiral ribs at the base of the grooves, means for rotating the rolls, additional means for moving said rolls axially in opposite directions relatively to each other, a revolving check spindle revolved in one direction by the spiral rotation of the blank and means for revolving said spindle back to the starting point.

11. In a machine for making drills, a pair of rollers having co-acting spiral ribs registering with each other at the meeting faces of the rollers, means for feeding the drill blank between said rollers in registration with the ribs, means brought into action by the first named means for rotating the rollers to bring the ribs in contact with opposite faces of the drill, and means for shifting the rollers axially relatively to each other to maintain the meeting faces of the ribs in registration with each other during rotation, whereby the drill blank is grooved and the grooved drill returned to its starting position.

12. In a machine for making drills, a pair of grooving rollers having co-acting spiral grooves and spiral ribs at the bases of the grooves, a continuously rotating driving member, means including a clutch movable into and out of connection with the driving member for transmitting intermitting rotary motion from the driving member to the rollers, means for feeding the drill between the rollers, and additional means brought into action by the forward movement of the last named means for throwing said clutch into action and thereby rotating the rollers to return the drill and its forward feeding means to their starting positions.

13. In a machine for making drills, a pair of intermittingly rotatable grooving rollers movable axially relatively to each other, means including a clutch for rotating said rollers one revolution at a time, additional means for moving said rollers axially relatively to each other, and further means for throwing the clutch out of action after each revolution of the rollers.

14. In a machine for making drills, a pair of intermittingly rotatable grooving rollers movable axially relatively to each other, means including a clutch for rotating said rollers one revolution at a time, automatic means controlled by the rotation of said rollers for throwing the clutch out of action after one revolution, means for feeding the drill between the rollers while at rest, additional means brought into action by the drill feeding means for operating the clutch releasing means for throwing the clutch releasing means out of action, thereby permitting the clutch to act to operate the rollers, and thereby return the drill and its feeding means to its starting position, and further means for moving the rollers axially relatively to each other during such rotation.

15. In a machine for making drills, a pair of intermittingly rotatable grooving rollers having a series of sets of spiral grooves and spiral ribs at the bases of the grooves, means for rotating the rollers intermittingly one revolution at a time, additional means for moving the rollers axially relatively to each other, a drill holder movable toward and from and parallel with the rollers, means for moving the drill holder toward the rollers to feed the drill through one set of grooves while the rollers are at rest, said rollers acting upon the drill to return the same and its holder to its starting position, and mechanism connected to the roller rotating mechanism for moving the drill holder parallel with the rollers.

In witness whereof I have hereunto set my hand this 25th day of July 1908.

FRANK LAPLANT.

Witnesses:
H. E. CHASE,
C. M. McCORMACK.